United States Patent [19]

Chamberlin et al.

[11] Patent Number: 4,736,988
[45] Date of Patent: Apr. 12, 1988

[54] SPRING CLIP RETENTION MEANS

[75] Inventors: James L. Chamberlin, Farmington Hills, Mich.; James E. Browning, Adel, Ga.; Frank L. Harris, Carmel, Calif.

[73] Assignee: ITT Corporation, New York, N.Y.

[21] Appl. No.: 346,518

[22] Filed: Feb. 8, 1982

[51] Int. Cl.$^4$ ................................................ B60B 7/00
[52] U.S. Cl. .............................. 301/37 R; 301/37 CD
[58] Field of Search ............... 301/37 R, 37 P, 37 PB, 301/37 TP, 37 C, 37 CD

[56] References Cited

U.S. PATENT DOCUMENTS

| | | | |
|---|---|---|---|
| 2,996,337 | 8/1961 | Hurd | 301/37 PB |
| 3,095,241 | 6/1963 | Fitzgerald | 301/37 R |
| 3,973,801 | 8/1976 | Beisch et al. | 301/37 R X |
| 4,218,099 | 8/1980 | Bayman et al. | 301/37 R |
| 4,231,619 | 11/1980 | Beisch et al. | 301/37 R X |
| 4,363,520 | 12/1982 | Connell | 301/37 PB |

*Primary Examiner*—David A. Scherbel
*Assistant Examiner*—Russell D. Stormer
*Attorney, Agent, or Firm*—James B. Raden; Robert P. Seitter

[57] ABSTRACT

A spring-action retention clip for use with the retaining ring of an automotive wheel cover, trim ring or the like. The clip includes a pair of snap-in tabs at its axially outer end for locking the clip into a pair of slots in a radially directed flange portion of the retaining ring. The clip is provided with a reverse-bent, bubble-like rounded portion at its inner end for resiliently engaging the safety bead depression in the radially facing flange of the vehicle wheel. The bubble end portion joins the body of the clip by way of an angular intermediate portion which permits deflection of the bubble portion as the wheel cover or trim ring is installed on the wheel until the bubble end snaps into the safety bead depression. The bottom portion of the bubble end portion includes a center leg which is directed radially inwardly then axially outwardly around the axially inward end of the flange portion of the retaining ring. The leg functions to facilitate installation and to prevent the retention clip from reversing itself when the wheel cover is installed on the wheel.

11 Claims, 2 Drawing Sheets

SPRING CLIP RETENTION MEANS

BACKGROUND OF THE INVENTION

This invention relates to wheel cover retention means and, more particularly, to a spring clip retention means having a deflectable member which resiliently engages the radially facing and axially extending flange of the wheel.

Wheel cover retention means are known and have been widely used in the art to maintain the wheel cover in position on the wheel. The retention means typically take the form of clips or bands which are formed with tooth portions for bitingly engaging the radially facing flange of the wheel. The biting teeth engage the wheel flange at a position intermediate the outer wheel rim and the inner safety bead of the wheel. These prior art retention means may take the form of individual clips attached to retaining rings or bands, or may be integrally formed with the retaining rings.

With the advent of high-strength low-allow (HSLA) wheels, however, these prior art retention means have two distinct disadvantages due to the hard surface of the HSLA wheels. First, the retention teeth cannot provide the penetration and biting engagement on the hard surface of the new HSLA wheels as they do on traditional mild steel wheels. That is, HSLA wheels are made of a steel which can be harder than the material of a typical retention clip or retaining ring and efficient biting engagement therefore is not always achieved. The second disadvantage is that since a given automobile manufacturer may use HSLA and mild steel wheels interchangeably, the retention means must accommodate both wheel types. That is, since the outside diameters of interchangeable wheels must be identical and since the HSLA wheels have significantly thinner walls portions, the inside diameters of HSLA wheels are significantly greater than the inside diameters of the corresponding interchangeable mild steel wheels. Thus, a prior art retention clip or retaining ring which is designed for the mild steel would not accommodate the larger inside diameter HSLA wheel as the retention provided would be too loose to retain the wheel cover on the HSLA wheel.

These and other disadvantages are overcome by the present invention wherein there is provided a spring clip retention means having a deflectable portion which resiliently engages a radially facing flange of the wheel. Since the deflectable portion is deflectable from a position greater than the inside diameter of a HSLA wheel and deflectable to a position which is less than the inside diameter of a mild steel wheel, the retention means in accordance with the present invention readily accommodates both of the interchangeable wheels.

SUMMARY OF THE INVENTION

Briefly, a spring clip retention means for mounting wheel ornamentation to the radially facing flange of a vehicle wheel is provided. The wheel ornamentation includes a generally circular ornamental member suitably joined to an axially facing flange of a retaining ring. The retention means comprises a plurality of clips circumferentially spaced along a radially facing flange of the retaining ring. Each of the clips includes a body which provides an axially and circumferentially extending surface at least a portion of which engages the radially facing flange. The axially outer end of the body has at least one snap-in tab extending through a slot in the generally axially facing flange portion of the retaining ring for fixedly mounting the clip to the retaining ring. The body of the clip includes an integral reverse-bent and radially outwardly extending rounded portion at the axially inward end thereof which forms a cantilevered rounded spring portion for resiliently engaging the radially facing flange of the wheel.

BRIEF DESCRIPTION OF THE DRAWINGS

The advantages of this invention will become more readily appreciated as the same becomes better understood by reference to the following detailed description when taken in conjunction with the accompanying drawing wherein.

DETAILED DESCRIPTION

Figure 1:
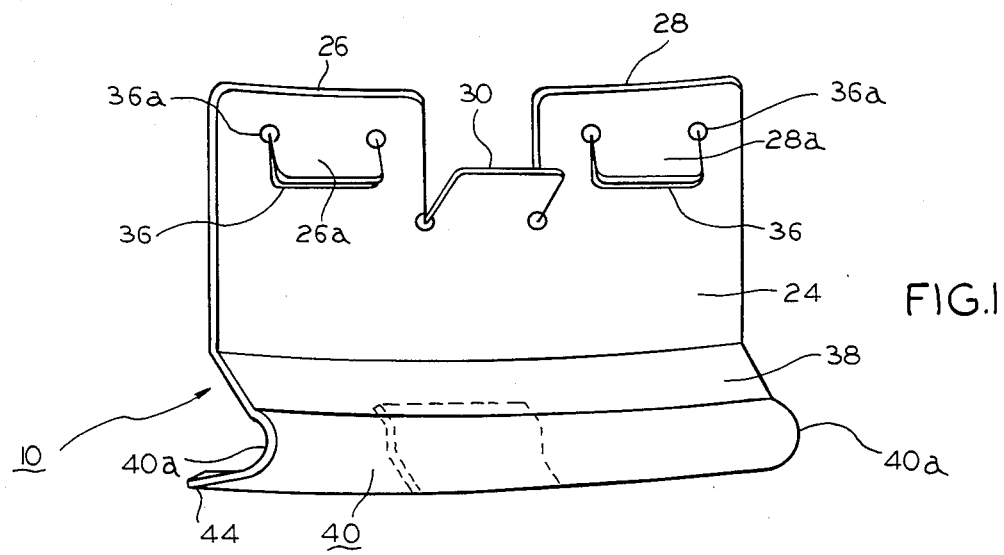
FIG. 1 is a pictorial view of a spring clip retention device in accordance with the present invention.
Figure 2:
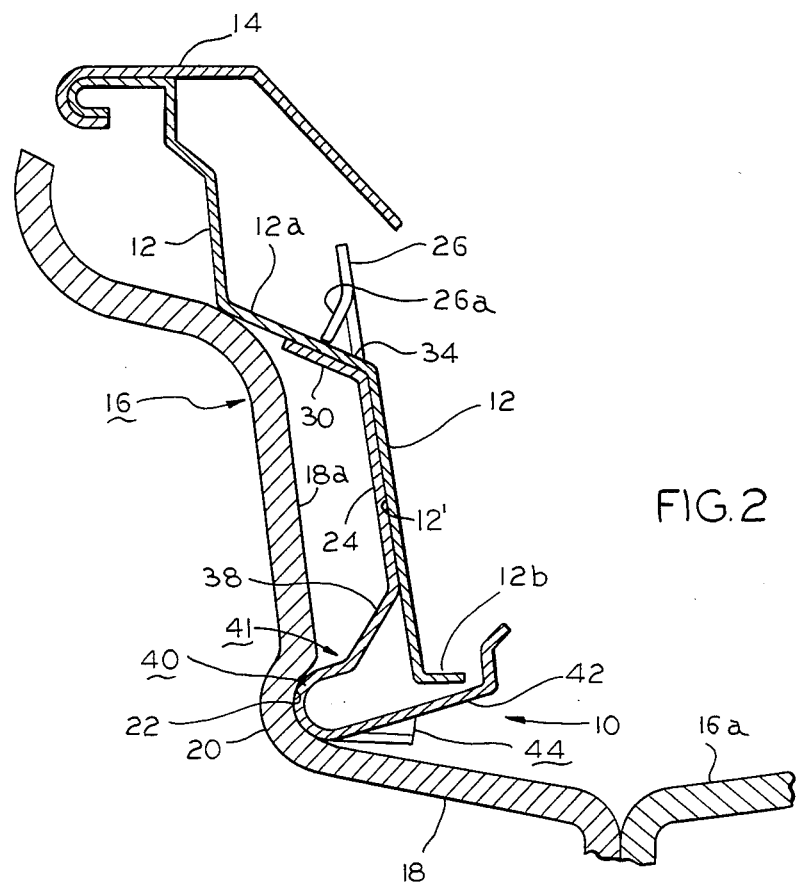
FIG. 2 is a partial cross-sectional view of a wheel cover in conjunction with a wheel rim and further illustrates a cross-sectional view of the spring clip retention means in accordance with the principles of the present invention; and, FIGS. 3a–3c provide plan, side and the bottom views of the spring retention clip of the previous drawing figures.

Referring now to FIGS. 1 and 2 there is shown generally at 10 a spring clip retention means in accordance with the present invention. In FIG. 2 retention means 10 is shown in cross-section in conjunction with a mounted wheel cover comprising a retaining ring 12 and an outer ornamental member 14. Wheel 16 includes a central circular body portion or spider 16a with a multi-flanged drop-center rim 18 welded to its periphery. Rim 18 includes an axially directed and radially facing flange 18a which is normally used to mount a wheel cover in the prior art devices. Wheel rim 18 further includes a safety bead 20 which functions to securely position the rubber tire wall on the radially outer surface of wheel 16 and to retain the tire on the wheel when air pressure is lost. The radially inner surface of wheel rim 18 therefore includes a depression 22 which corresponds to safety bead 20.

For purposes of clarity and definiteness in describing the details and construction of the spring clip retention means in accordance with the present invention, the terms "radially outward" and "radially inward" will be employed to indicate left and right directions, respectively, as viewed in FIG. 2, and the terms "axially outward" and "axially inward" will refer to the up and down directions in the same figure. The axis used as a reference line being that of wheel 16 which is also coincident with the axis of the wheel cover. The same terms or the equivalence thereof, will be employed in the claims and the latter are to be interpreted in view of the above definitions.

Referring again to FIGS. 1 and 2, it can be seen that retention means 10, which is preferably formed from a flat strip or sheet of hard material such as carbon or spring steel, includes a base or body portion 24 which engages the radially outer side of radially facing flange 12' of retaining ring 12. In one constructed embodiment, the material of retention means 10 was 1065 steel which was tempered for hardness and phosphate coated. In a preferred embodiment of the present invention, retention means 10 includes a pair of tabs 26 and 28 which extend axially outwardly at the axially outward end of base or body 24, as best illustrated in FIG. 1. The base or body portion 24 further includes a central or middle tab 30 which is formed so that it extends generally radially and axially outwardly for engagement with the axially inner side of a stepped portion 12a of the retaining flange of retaining ring 12. The two end tabs are respectively received within and extend axially outward through a pair of pierced slots 34 which are provided near the radially inner end of stepped portion 12a. Each end tab includes a secondary tab 26a and 28a as best illustrated in FIG. 1. The secondary tabs are struck from the respective end tabs along a U-shaped line 36 at the ens of which apertures 36a are formed to relieve the stess and reduce the likelihood of tearing of the metallic material of retention means 10. The portion of retention means 10 as thus far described is set forth in greater detail in U.S. Pat. No. 4,218,099 to which reference may be had for a more detailed description thereof.

It can be seen that body 24 of retention means 10 further includes a radially outwardly and axially inwardly extending intermediate flange or web 38 which joins a curved and reverse-bent portion 40 and which together form a cantilever rounded spring portion 41. The reverse bend or portion 40 forms a semicylindrical surface which is semicircular in cross section to provide a bubble-like surface for resiliently engaging the radially facing flange 18a of wheel 16. The lower leg of reverse-bent portion 40 joins a radially inwardly and then axially outwardly extending intermediate tab portion 42 which encircles the axially inner or free end 12b of retaining ring 12. The axially inward edge of body 24 further includes deflected corner portions 44 extending radially and axially inwardly of reverse-bent portion 40.

Figure 3A:
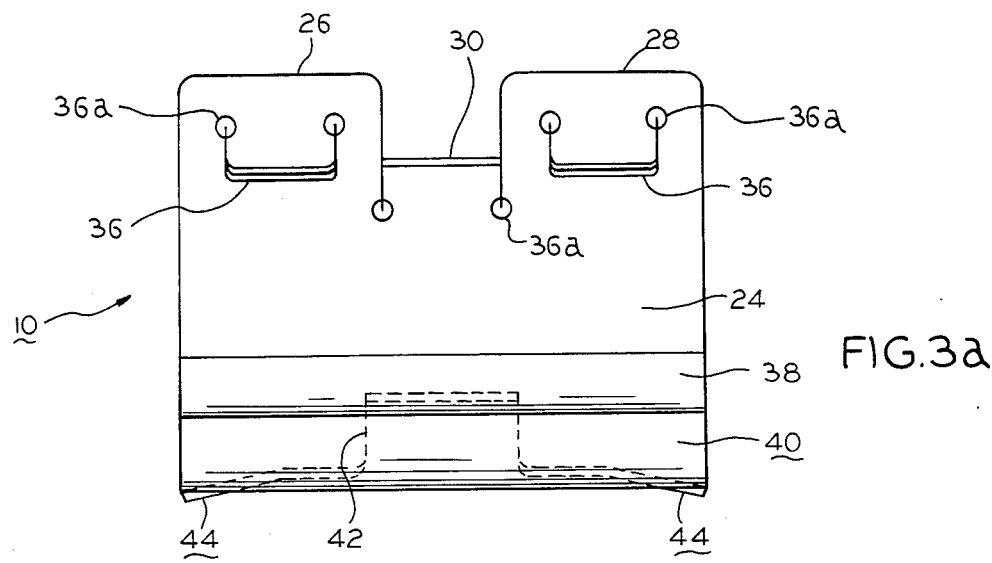
Figure 3B:
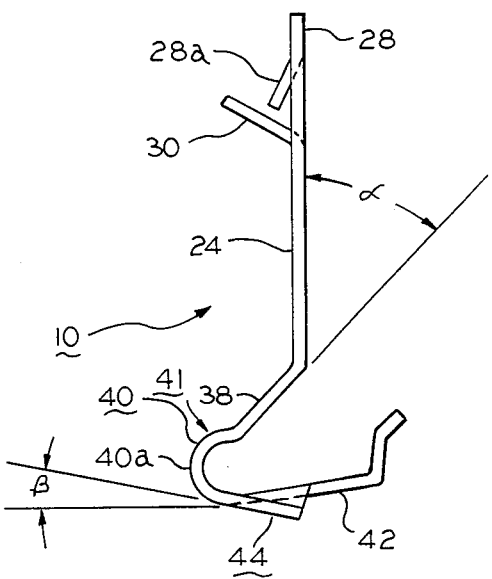
Figure 3C:
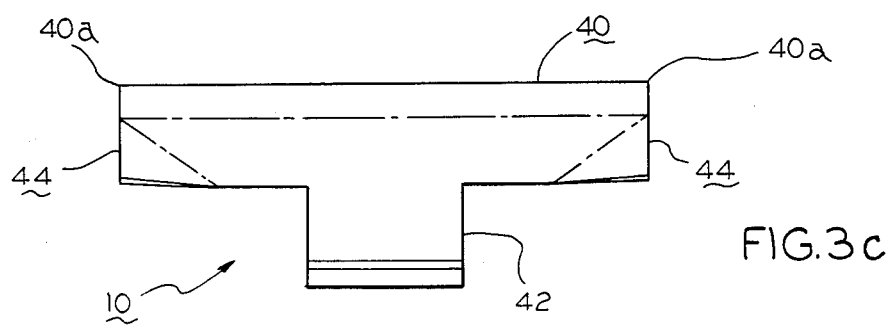

The structural details of retention means 10 are set forth in greater detail in FIGS. 3a–3c. FIG. 3a provides a plan view of retention means 10 which is similar to the pictorial view of FIG. 1, and FIG. 3c is a bottom view of FIG. 3a. FIG. 3b is an end view of retention means 10 and sets forth somewhat more clearly the angular relationships of intermediate web 38 and deflected corner portions 44. It can be seen by reference to FIG. 3b that intermediate web 38 is angularly related to the body portion 24 as defined by the angle alpha. In currently preferred practice angle alpha is approximately 42 degrees. It also can be seen that deflected corner portions 44 are angularly related to the horizontal direction or diameter of the wheel as defined by angle beta. In currently preferred practice angle beta is approximately 8 degrees. The function of this angular relationship is to ensure a sufficient lead-in angle to provide inward deflection of bubble-like portion 40 as it slides toward the safety bead portion 22 in rim 18 of wheel 16 when the wheel cover is inserted into the wheel. That is, as the wheel cover or trim ring is initially installed onto the wheel the angular surfaces of deflected corner portions 44 initially engage the axially outer portions of rim 18 of wheel 16. Accordingly, due to the angular relationship provided by angle beta of corner portions 44 the installation force provides a radially inwardly directed force component which results in an initial radially inward deflection of bubble portion 40 to facilitate the further insertion of the wheel cover and the attached retention means into the wheel. It is also noted that this angle can be increased to accommodate a given design and it is anticipated that angles on the order of five to thirty-five degrees will provide good results.

A further function provided by the structure of reverse-bent portion 40 is to provide anti-rotation points 40a which preclude or substantially reduce relative rotation between the retaining ring and the vehicle wheel. That is, the end or edge points 40a of a straight line along the generally semicylindrical surface of portion 40 provide relatively sharp teeth at the approximate center of the semicircular end radii which tend to bitingly engage the wheel upon any relative rotation in the corner direction.

It should also be appreciated that extension 42 provides a restraining tab which precludes radially outward deflection of retention means 10 during the installation process. This is important in those situations where the wheel cover may be improperly installed in a non-coaxial manner as by an inexperienced operator. Otherwise, the retention means could be undesirably deflected away from the retaining ring.

It will be appreciated by those skilled in the art that retention means 10 may be used with conventional wheel covers, including trim rings, and simulated wire wheel covers. In currently preferred practice five equally spaced retention clips are used to mount the wheel cover or trim ring. Further, in currently preferred practice retaining ring 12 is made of a separate member of galvanized steel whereas the ornamental member 14 is provided of an aluminum or stainless steel material which is crimped or clinched to the retaining ring and which may be buffed or suitably prepared to provide an attractive appearance. In this regard, however, it will be appreciated by those skilled in the art that members 12 and 14 may comprise an integral or one-piece construction of any suitable material.

What has been taught, then, is a wheel cover or trim ring retention means facilitating, notably, the retention of ornamental wheel covers on HSLA wheels and which can be used on both HSLA and mild steel wheels of an interchangeable pairing. The forms of the inventions illustrated and described herein are but preferred embodiments of these teachings. They are shown as illustrations of the inventive concepts, however, rather than by way of limitation, and it is pointed out that various modifications, and alterations may be indulged in within the scope of the appended claims.

What is claimed is:

1. A spring clip retention means for mounting wheel ornamentation to the radially facing flange of a vehicle wheel, said wheel ornamentation including a generally circular ornamental member joined to an axially facing flange of a retaining ring, said retention means comprising: a plurality of clips circumferentially spaced along a radially facing flange of said retaining ring each of said clips including a body which provides an axially and circumferentially extending surface at least a portion of which engages said radially facing flange, the axially outer end of said body having at least one snap-in tab extending through a slot in a generally axially facing intermediate flange portion of said retaining ring for fixedly mounting said clip to said retaining ring, and said body having an integral reverse bent and radially outwardly extending rounded portion at the axially inward end thereof forming a cantilever rounded spring portion for resiliently engaging the radially facing flange of said wheel and wherein said body includes a second tab portion at said axially inward end portion extending radially inwardly and then axially outwardly for encircling the axially inner end of said retention ring in normally spaced-apart relationship therewith for limiting the radially outward deflection of said rounded spring portion.

2. The retention means according to claim 1, wherein said second tab portion extends from an intermediate edge portion of said rounded portion.

3. The retention means according to claim 1, wherein said rounded spring portion is spaced a predetermined distance from said axially outer end so that said spring portion engages a radially outward depression in the radially facing flange of said wheel.

4. The retention means according to claim 1, wherein said rounded portion joins said body through an axially and radially extending intermediate portion which forms an acute angle relative to said radially facing flange of said retaining ring.

5. The retention means according to claim 4, wherein said acute angle is approximately 42 degrees.

6. The retention means according to claim 1, wherein said body is generally flat and rectangular and includes radially inwardly deflected corner portions at said axially inward portion.

7. The retention means according to claim 1, wherein the axially inner end of said reverse bent rounded spring portion includes an axially and radially inwardly directed extension which forms an acute angle relative to the diameter of said retaining ring so that upon the initial engagement of said extension with the axially outer portions of said wheel said rounded spring portion is deflected radially inwardly to permit insertion of said retaining ring into said wheel.

8. The retention means according to claim 7, wherein said acute angle is in the range of 5 to 35 degrees.

9. The retention means according to claim 8, wherein said angle is approximately 8 degrees.

10. A spring clip retention means for mounting wheel ornamentation to the radially facing flange of a vehicle wheel, said wheel ornamentation including a generally circular ornamental member joined to an axially facing flange of a retaining ring, said retention means comprising: a plurality of clips circumferentially spaced along a radially facing flange of said retaining ring each of said clips including a body which provides an axially and circumferentially extending surface at least a portion of which engages said radially facing flange, means at the axially outer end portion of said body for fixedly mounting said clip to said retaining ring, and said body having an integral reverse bent and radially outwardly extending rounded portion at the axially inward end thereof forming a cantilever rounded spring portion for resiliently engaging the radially facing flange of said wheel and wherein said body includes a tab portion at said axially inward end portion extending radially inwardly then axially outwardly for encircling the axially inner end of said retention ring in normally spaced-apart relationship therewith for limiting the radially outward deflection of said rounded spring portion.

11. A wheel cover retention means for use with a vehicle wheel having an annular generally radially facing and axially extending wheel flange, said wheel cover retention means comprising, in combination:
a retention ring having a generally axially extending retaining flange with an intermediate stepped portion extending generally radially outwardly;
a plurality of circumferentially spaced retention clips in snap-on engagement with said retention ring, each clip including:
an axially and circumferentially extending base portion engaging the radially outward side of said retaining flange and having at least one tab at the axially outward end of said base which projects through a slot in said stepped portion of said retaining ring and axially outwardly from the radially inward side of said retaining ring;
a reverse-bent portion at the axially inner end of said base portion which extends radially outwardly of the free end of said retention ring and which is curved at the reverse bend to provide a bubble-like rounded radially outward surface for resiliently engaing the radially facing flange of said vehicle wheel; and
wherein said body includes a second tab portion at said axially inward end portion extending radially inwardly and then axially outwardly for encircling the axially inner end of said retention ring in normally spaced-apart relationship therewith for limiting the radially outward deflection of said rounded spring portion.

* * * * *